United States Patent [19]

Chandler

[11] Patent Number: 4,516,388
[45] Date of Patent: May 14, 1985

[54] HYDRAULIC BEDKNIFE ADJUSTER FOR REEL-TYPE MOWING EQUIPMENT

[76] Inventor: Noel W. Chandler, 114 Venus St., Jupiter, Fla. 33458

[21] Appl. No.: 74,656

[22] Filed: Sep. 12, 1979

[51] Int. Cl.³ .......................................... A01D 55/20
[52] U.S. Cl. ...................................... 56/249; 56/11.9
[58] Field of Search ................... 56/249, 251, 253, 7, 56/11.9, 10.2

[56] References Cited

U.S. PATENT DOCUMENTS

| | | | |
|---|---|---|---|
| 2,532,733 | 12/1950 | Santelle | 56/253 |
| 2,896,390 | 7/1959 | Cunningham | 56/249 |
| 3,187,492 | 6/1965 | Bergen | 56/249 |
| 3,461,656 | 8/1969 | Ausdall | 56/249 |
| 3,680,293 | 8/1972 | Klemenhagen | 56/249 |
| 3,992,858 | 11/1976 | Hubbard et al. | 56/11.9 |

*Primary Examiner*—Hugh R. Chamblee
*Assistant Examiner*—David I. Tarnoff
*Attorney, Agent, or Firm*—Barry L. Haley

[57] ABSTRACT

A hydraulically-actuated bedknife alignment and positioning mechanism which uses the hydraulic power source to precisely adjust the distance between the blade of a reel-type lawn mower and the bedknife for proper cutting action. The system includes a source of hydraulic fluid under pressure, a hydraulic cylinder (mounted to the frame of the mower) which houses a piston connected by a linkage arm to the bedknife that is biased relative to the reel blade and attached pivotally to the frame. During adjustment, the cylinder is pressurized, forcing the piston to move the bedknife into contact with the blades of the mower. When the hydraulic pressure is removed, the biasing force pushes the bedknife away from the reel blade, but a hydraulic locking valve in the actuating cylinder line limits precisely how far the bedknife is biased away from the reel blade before sealing shut, effecting proper distance setting. The hydraulic adjustment may be remotely actuated by the operator of the mower.

8 Claims, 7 Drawing Figures

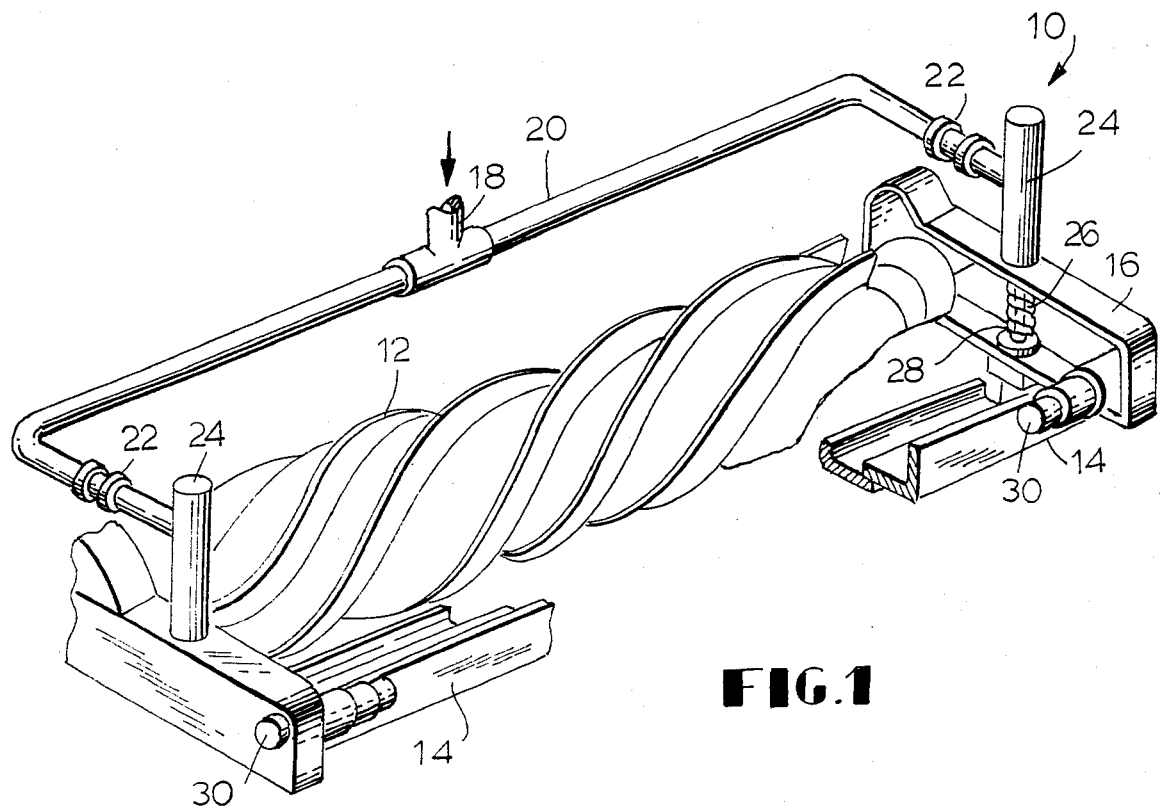
FIG.1
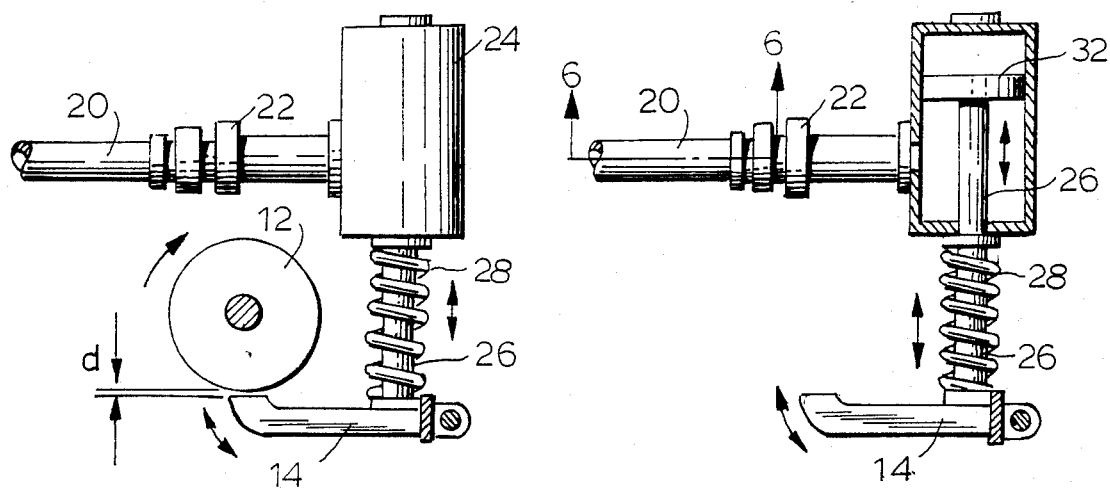
FIG.2a     FIG.2b

HYDRAULIC BEDKNIFE ADJUSTER FOR REEL-TYPE MOWING EQUIPMENT

BACKGROUND OF THE INVENTION

For proper cutting action, the distance between the bedknife and the cutting blade on a reel-type lawn mower is extremely critical. Typically, in conventional reel mowers, adjustment is manually done by rotating mechanical, threaded members that position the bedknife relative to the blade. This operation is time consuming, usually anywhere from ten to thirty minutes, and the resulting adjustment is often shortlived due to vibrations experienced during the mower operation, the blade striking hard objects, or violent movements of the mower over the ground.

Another problem in achieving proper and precise reel bedknife adjustment is that oftentimes operators of the equipment are unknowledgeable or inexperienced in the proper adjustment of the mower. If the blade, bedknife adjustment is too tight, premature wear will result, greatly reducing the operational life of the unit. On the other hand, if too great a distance is provided, improper cutting is the result along with other wear problems. Too much clearance can result in the abrasive surface of the grass rounding the edges of the blades, which even if properly adjusted later, results in a lack of proper cutting.

Another deficiency of the screw-type mechanical bedknife adjustment is that since it is mechanical in nature, it has threaded interacting parts. The mechanism, in order to be movable, must be lubricated which is undesirable because of the dirt and grit environment to which it is exposed. Therefore, it is not uncommon for these mechanical types of adjustments to freeze up or lock up.

And yet another problem is that most commercial mowing operations involve using a plurality of reel blade mowers pulled by a single vehicle. Each mower must be individually adjusted, a very time consuming operation.

The present invention uses the hydraulic fluid pressure available in most industrial reel-type mowers to overcome the deficiencies of the prior art by providing an automatic, remotely operated adjustment mechanism which will position in a single operation each bedknife in a plurality of mowers to a predetermined distance from the reel blades every time it is activated. Other reel mower blade adjusters in the prior art, such as U.S. Pat. No. 3,680,293 have failed to do this.

BRIEF SUMMARY OF THE INVENTION

A system for rapidly adjusting the distance between a bedknife and a reel-type lawn mower blade to the proper cutting distance that utilizes a source of hydraulic fluid under pressure for movement and locking of a bedknife pivotally mounted to the lawn mower frame and movable into an engagable position with the reel blade. The system includes at least one hydraulic cylinder coupled to a source of hydraulic fluid under pressure that is actuated by a remote control valve located at the operator's console. A movable piston within the hydraulic cylinder is coupled by suitable linkage to the bedknife. The bedknife is biased by a spring or the like in a direction that opposes movement of the piston (and linkage arm) when the cylinder is pressurized. The piston is sized so that under system pressure, however, the piston and linkage can move the bedknife against the biasing force into direct contact between the bedknife edge and the lawn mower reel blade. The heart of the system includes a back flow metering locking valve which is connected in the line between the remote system control valve and the hydraulic cylinder. When the system pressure is diminished by the operator releasing the remote control valve causing the pressure in the cylinder against the piston to be reduced, the back flow metering locking valve allows a predetermined amount of fluid to be displaced (under action of the biasing force on the piston) so that the bedknife will move a desired amount prior to the seating of the locking valve. Once the locking valve element seats, the bedknife is firmly locked in position at the proper distance from the reel blade by hydraulic pressure maintained by the biasing force.

As applied to a conventional reel-type mower having hydraulic fluid under pressure available, the bed-knife adjustment system is tied to and in fluid communication with the hydraulic system used to operate the mower.

In one embodiment, the bedknife which is pivotally attached to the lawn mower housing is biased to move away from the reel blade by a spring. When the remote operator control valve is opened, fluid under pressure passes through the one-way locking valve into the cylinder, forcing the piston to move. The linkage attached from the piston to the bedknife causes the bedknife into physical engagement with the reel blade. When the remote operator control valve is closed, reducing pressure in the cylinder housing, the spring acts to force the bedknife away from the blade. The movable element in the locking valve that seals the locking valve permits sufficient reverse displacement of fluid prior to seating in the back flow direction for precise displacement of the bedknife away from reel blade. Once the valve element is seated, the bedknife is locked into place. The displacement distance of movement is determined to be the precise bedknife/reel blade separation distance desired for the machine for proper cutting.

In one embodiment, the locking valve includes a movable sealing element (mounted in an internal passage) that must traverse a predetermined distance to reach the valve seat when the system pressure is diminished prior to sealing in the back direction. This displacement of the valve element prior to sealing is calculated to provide the necessary amount of displacement of the bedknife (through the linkage and piston system) when system pressure is reduced. Once the valve is seated and adjustment achieved, the movable valve element is held under pressure due to the biasing means so that the system holds the bedknife in adjustment. The hydraulic locking valve may also include a means for adjusting the amount of displacement of the movable valve element so that the system itself can be adjusted for a particular predetermined cutting distance and movement between the bedknife and the reel-type blade.

It is an object of the invention to provide a hydraulic system to precisely but quickly adjust a bedknife to a predetermined, fixed distance from the blades in a reel-type mower.

It is another object of the present invention to provide an automatic bedknife, reel blade adjustment system which utilizes a hydraulic locking valve with reverse flow displacement.

And yet another object of the invention is to provide a remotely actuated bedknife reel blade adjustment so that an operator can adjust one or more mowers simultaneously with a single control valve located at the operator's console.

In accordance with these and other objects which will be apparent hereinafter, the instant invention will now be described with particular reference to the accompanying drawings.

BRIEF DESCRIPTION OF THE DRAWINGS

FIG. 1 is a perspective view of the automatic bedknife-reel blade adjustment system in accordance with the present invention mounted on a reel-type lawn mower.

FIGS. 2a and 2b are schematic side views showing the actuating cylinder connected to the piston which moves the bedknife against the reel blades.

PREFERRED EMBODIMENT OF THE INVENTION

Figure 3:
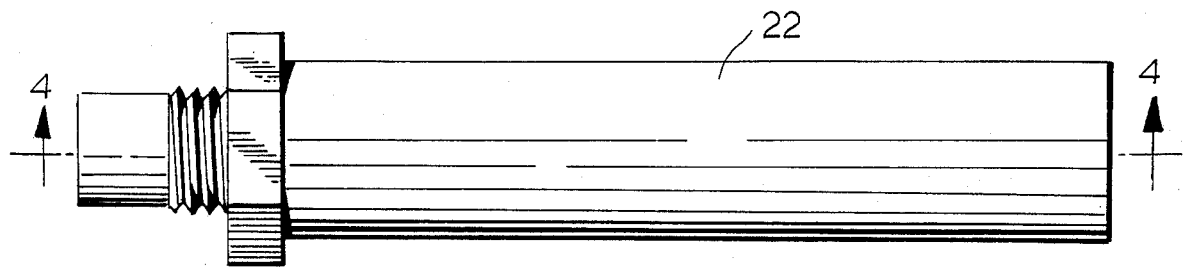
FIG. 3 is a side elevational view of the hydraulic locking valve utilized in the present invention.

Referring now to the drawings and specifically FIG. 1, the present invention is shown generally at 10 mounted on the frame 16 of a reel-type lawn mower having a reel blade 12. The bedknife 14 is pivotally attached to the lawn mower frame 16 by pins 30 and engages the lower end of shaft 26, the upper end of shaft 26 being connected to a piston (not shown in FIG. 1) mounted in hydraulic cylinder 24. (The system is the same on each side.) Hydraulic fluid under pressure is received from the lawn mower hydraulic system through a remote control valve (not shown) into a "T-shaped" conduit 18 through conduit lines 20, through the hydraulic locking valves 22 into the hydraulic cylinders 24. Looking at FIGS. 2a and 2b, the bedknife 14 pivots around pin 30 as indicated by the arrows. The spring 28 biases the bedknife 14 at all times, tending to force it about pivot point 30 away from the blade 12. As shown in FIG. 2b, hydraulic pressure on piston 32 received through conduit 20 forces the piston upward, drawing the bedknife pivotally upward into direct contact with the blade 12.

Figure 4:
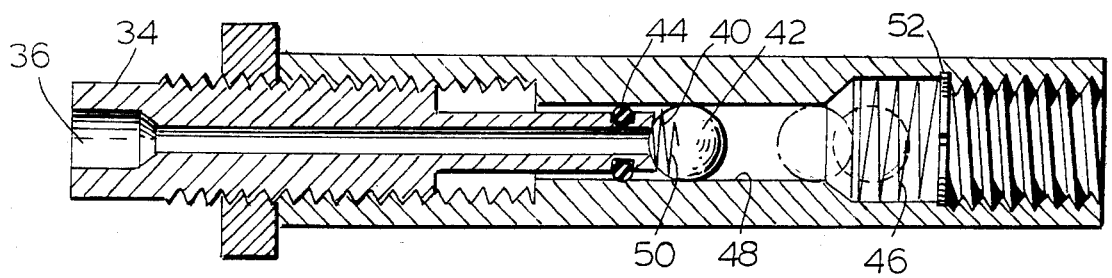
FIG. 4 is a side elevational view in cross-section of the hydraulic locking valve shown in FIG. 3.
Figure 5:
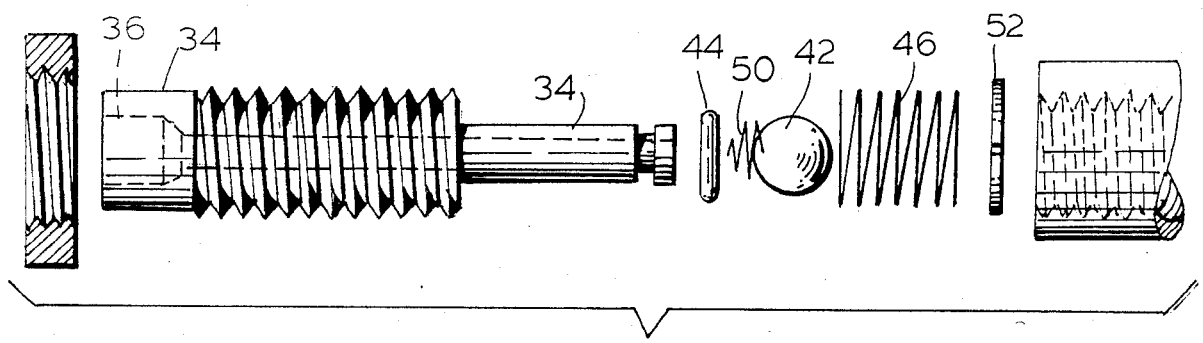
FIG. 5 is an exploded view of the hydraulic locking valve shown in FIGS. 3 and 4.

FIGS. 3, 4, and 5 show the operation of the adjustable hydraulic locking valve 22 and the displacement that achieves sufficient spacing between the bedknife and the reel blade to effect precise adjustment. The locking valve includes a housing 22 and an exteriorly threaded, tubular sleeve 34 having passage 36 coupled to the hydraulic fluid source and a smaller fluid passage 34b. The sleeve 34 has threads that engage a threaded chamber 22a in a housing 22 to adjust the longitudinal position of sleeve 34 within passage 48 in housing 22. A small tubular end portion 34a of sleeve 34 is disposed in chamber 48 and includes an "O"-ring seal 44. The end face 40 of sleeve portion 34a acts as a valve seat for ball 42, movable (but snuggly) positioned in chamber 48. Chamber 48 opens into a larger chamber 48a that houses a ball positioning spring 46 coupled to a retaining washer 52. Chamber 48a is in fluid communication with the hydraulic cylinder and piston shown in FIGS. 2a and 2b. A small spring 50 aids in unseating ball 42 when the system is activated.

To operate the system, the heart of which is the locking valve shown in FIGS. 3, 4, and 5, the remote control valve is actuated by the operator from his console which causes fluid pressure to enter into chamber 36 and passage 34b of the locking valve. The fluid pressure unseats ball 42 from valve seat 40, causing the ball to be displaced into enlarged chamber 48a which allows the fluid from the pressurized system to flow through the valve in one direction and into the cylinder housing shown in FIG. 2b. The fluid pressure pushes against piston 32 lifting the bedknife 14 into direct contact with the reel blade, overcoming the biasing force of spring 28. Once the bedknife has firmly engaged the reel blade 12, the operator releases the remote control valve causing a pressure reduction in the system. At this instance, the ball (dotted) as shown in FIG. 4, is positioned within chamber 48. A biasing force on the spring then pushes the bedknife and the piston causing fluid to be displaced in the opposite direction through the locking valve 22. The ball 42, which is at the mouth of chamber 48, will then be displaced until it seats firmly on valve seat 40. This amount of fluid displacement which is measured by the passage longitudinal length of passage 48 from the mouth of chamber 48a to the valve seat 40 constitutes the amount of displacement allowable for movement of the bedknife away from the blade under the biasing force. Once the ball 42 contacts valve seat 40, the back flow of fluid is stopped and the bedknife is thus firmly locked into position.

The locking valve shown in FIGS. 3, 4, and 5 is adjustable in the sense that sleeve 34, because of its threaded exterior and the internal threads in housing 22, can be rotated to change its longitudinal position internally with respect to housing 22 and consequently the distance of valve seat 40 relative to the opening of passage 48 into chamber 48a can be changed. Since this distance is related directly to the amount of displacement of the bedknife away from the blade, it thus allows for adjustment for particular mower or system.

Figure 6:
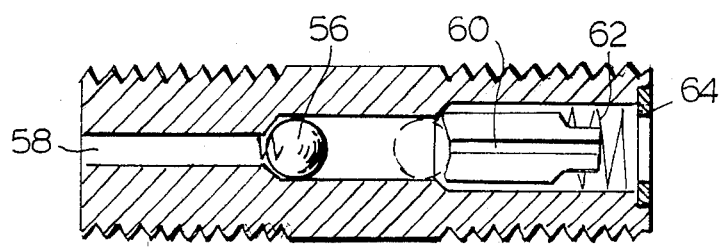
FIG. 6 is a side elevational view in cross-section of an alternate embodiment of the hydraulic locking valve.

FIG. 6 shows an alternate embodiment of the hydraulic locking valve which is not adjustable and which has a fixed displacement. In the embodiment shown in FIG. 6, internal passage 66 acts as the displacement chamber housing ball 56 which seats against valve seat 70 at the end of passage 58. A ball guide 60 is disposed in enlarged chamber 68 which is connected to a spring 62 and a retaining washer 64 at the end of passage 68, which allows the ball 56 to move into chamber 68 to allow fluid under pressure in the system to flow from left to right into the hydraulic chamber to contact the actuating piston. The ball retainer 60, however, prevents the ball from moving idly around within the chamber 68. Again as described above, the ball 56 fits snuggly within chamber 66 and the amount of fluid displacement which is realized by the piston connected to the bedknife is proportional to the amount of distance that the ball travels from the opening between passage 66 and chamber 68 and the valve seat 70.

Note that in both valve configurations the ball 42 in FIG. 4 and ball 56 in FIG. 6 fit snuggly within their respective displacement chambers such that when back flow of fluid under pressure in the reverse direction is achieved, fluid is not being displaced around the ball element in each case, but moves the ball element back to its valve seat.

Thus it can be seen that a plurality of mowers, each having a system described herein, can be actuated from a single remote control valve from the operator's console such that each bedknife of each mower will be simultaneously adjusted.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a reel-type mower having a reel blade and a bedknife movably attached thereto, a system for precisely positioning and retaining the bedknife at a predetermined distance relative to the blade, comprising:

means for hydraulically adjusting and locking a bedknife relative to a reel blade at a desired relative position;

means for actuating said hydraulic adjusting means;

a means for moving the bedknife in a first direction to a predetermined position relative to said reel blade under hydraulic pressure;

resilient force means for moving said bedknife in a counter direction to said first direction; and means for displacing a predetermined amount of hydraulic fluid to allow displacement of said bedknife from a first maximum position in said first direction to a second position in said counter direction relative to the amount of fluid displaced.

2. A system for positioning and retaining the bedknife at a predetermined distance relative to a reel-type blade as in claim 1, including:

a hydraulic locking means in fluid communication with said hydraulic adjusting means for locking said bedknife in a position relative to said reel blade at said desired cutting spatial relationship.

3. A system as in claim 2, wherein:

said means for moving said bedknife in a first direction includes a cylinder, a piston moveably mounted within said cylinder, a source of hydraulic fluid under pressure connected in fluid communication with said cylinder and said piston, said piston being connected to said bedknife.

4. A system as in claim 2, wherein said displacing means includes a housing having an internal passage therethrough, the passage including a first chamber, said housing being in fluid communication with the hydraulic fluid source under pressure at one end and with said means for moving the bedknife in a first direction at the other end, said first chamber having a valve seat, and a movable valve element positioned within said chamber for stopping fluid flow in one direction through said chamber, said valve element having a predetermined movable displacement while a predetermined amount of fluid is allowed to flow back to the source.

5. A device for precisely adjusting the proper spatial relationship between a reel blade on a lawn mower and a bedknife attached thereto comprised of:

a frame for supporting said reel blade and said bed knife;

a lawn mower reel blade movably attached to said frame;

a bedknife attached to said frame;

hydraulically actuated means for moving said bed knife in a first direction relative to said reel blade;

resilient force means for moving said bedknife in a opposite direction relative to said reel blade than said hydraulic actuating moves;

a source of hydraulic fluid under pressure connected to said hydraulic actuating means;

a hydraulic valve connecting between said fluids pressure source and said hydraulic actuating means, said hydraulic valve means including a fluid displacement means that allow fluid displacement in the direction of said resilient force means, whereby a reduction in fluid pressure to said fluid actuating means allows said resilient force means to move the bedknife to a desired spatial relationship with respect to said reel blade; and hydraulic locking means for locking said bedknife in its desired position.

6. A device for precisely positioning the relationship spatially between the bedknife and a reel blade on a reel blade type lawn mower for precise cutting comprising:

a frame for supporting said reel blade and said bed knife;

a bed knife movably connected to said frame;

a reel blade connected to said frame;

a fluid pressure source;

means connected to said bedknife and said fluid pressure source for moving said bedknife to a first position relative to said reel blade, whenever said means is actuated by said fluid pressure source;

a means for generating a force in opposition to said bedknife movement to said first position; and hydraulic fluid displacement means for allowing movement of said bedknife from said first position to said second predetermined adjustment position when said hydraulic pressure is removed from said actuating means, said bedknife being moved to said desired position by said force generating means.

7. A bedknife adjustment device as in claim 6 including:

means for hydraulically locking said bedknife in said desired position.

8. A device for adjustably positioning a bedknife relative to a lawn mower reel blade comprising:

lawn mower frame;

a reel blade movably attached to said lawn mower frame;

a bedknife movably connected to said frame;

a hydraulic pressure source;

hydraulically actuated means connected to said hydraulic pressure source for moving said bedknife in said first direction relative to said reel blade;

resilient means connected to said bedknife opposing movement of said bedknife in said first direction;

a hydraulic valve connected between said hydraulic actuating means and said hydraulic pressure source, said hydraulic valve allowing unrestricted hydraulic flow in a first direction for actuating said bedknife, when pressurized, and for allowing a predetermined amount of fluid to flow in the opposite direction under the influence of said resilient means when said system pressure is reduced; and a means for locking the bedknife relative to the reel blade hydraulically when said bedknife is in its desired position.

* * * * *